(12) United States Patent
O'Meara

(10) Patent No.: US 7,598,717 B2
(45) Date of Patent: Oct. 6, 2009

(54) CURRENT-SOURCED POWER SUPPLIES

(75) Inventor: Kevin Thomas O'Meara, Chatsworth, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 506 days.

(21) Appl. No.: 11/102,086

(22) Filed: Apr. 8, 2005

(65) Prior Publication Data

US 2006/0226823 A1    Oct. 12, 2006

(51) Int. Cl.
*G05F 1/00* (2006.01)
(52) U.S. Cl. .................. 323/283; 323/284
(58) Field of Classification Search .......... 320/140; 363/13, 21.01; 323/283, 284, 282
See application file for complete search history.

(56) References Cited

U.S. PATENT DOCUMENTS

| | | | | |
|---|---|---|---|---|
| 4,677,367 A | * | 6/1987 | Goodman | 323/222 |
| 4,720,668 A | * | 1/1988 | Lee et al. | 323/271 |
| 5,949,216 A | * | 9/1999 | Miller | 320/125 |
| 6,166,527 A | * | 12/2000 | Dwelley et al. | 323/222 |
| 6,525,513 B1 | * | 2/2003 | Zhao | 323/222 |
| 7,038,438 B2 | * | 5/2006 | Dwarakanath et al. | 323/283 |
| 2002/0181261 A1 | * | 12/2002 | Gaudreau | 363/108 |

* cited by examiner

*Primary Examiner*—Ahm E Ullah
*Assistant Examiner*—Arun Williams
(74) *Attorney, Agent, or Firm*—Tarolli, Sundheim, Covell & Tummino LLP

(57) ABSTRACT

A method for providing stable dc-to-dc power conversion from high impedance or pure current input sources by inverting the duty cycle control with respect to the duty cycle control used with low impedance or pure voltage input sources.

24 Claims, 5 Drawing Sheets

Traditional Buck

Traditional Boost

Current-Sourced Boost

Current Sourced Buck

CURRENT-SOURCED POWER SUPPLIES

The present invention relates in general to power supplies and more specifically to power supplies having a high impedance source.

BACKGROUND OF THE INVENTION

Switched mode power supplies are known in modern electronics as an efficient means of dc-to-dc conversion. These supplies provide different power supply characteristics. For example, a boost converter provides a dc-to-dc conversion in which the output voltage is higher than the input voltage. A buck converter, on the other hand, provides an output voltage that is lower than the input voltage. The buck-boost converter converts a positive input voltage into a negative output voltage.

These supplies operate from low impedance input power sources, such as pure voltage sources or voltage sources with low impedance in series. Such switched mode power supplies can be referred to as voltage-sourced power supplies or voltage-sourced converters. Such supplies may include a switch operated at a high rate, with each switch closing operation serving to store energy in an inductor, and each switch opening operation effecting a transfer of the stored energy from the inductor to a load connected to a regulator output. When applied to a low impedance voltage source, wherein the source voltage remains substantially constant over a range of source current, the duty cycle of the switch, i.e. the portion of time within each switching cycle that the switch is closed, or on, is varied in direct relation to the desired change in the regulator output voltage. That is, in response to an undesirably low regulator output voltage, e.g. due to an additional load demand or a decrease in source voltage, the duty cycle is initially increased in order to increase the output voltage. Correspondingly, the response to an excessive regulator output voltage is a decrease in the duty cycle, which is effective to decrease the output voltage.

One known topology for voltage-sourced switched-mode power supplies is the buck or step down converter, which provides an output voltage that is lower than the input voltage. As shown in FIG. 1, a simple buck converter 100 comprises input terminals 109 and 110 and output terminals 111 and 112 where terminals 110 and 112 are connected to ground. An input filter such as capacitor 102 is connected across input terminals 109 and 110; a shunt switch 103 is connected between input terminal 109 and output terminal 111. An energy storage element such as an inductor 104 is connected in series between the switch 103 and output terminal 111. A unidirectional conducting device, such as diode 108, is connected between ground and a point between switch 103 and inductor 104. An output filter such as capacitor 105 is connected across output terminals 111 and 112. A control device 106 is connected to both output terminal 111 and the control terminal for switch 103. A voltage source 101, with its small, effective, in series resistance, is connected across terminals 109 and 110 to provide power to the power converter. A load 107 is attached across terminals 109 and 110.

The control device 106 senses the voltage at output terminal 111, and controls the duty cycle of switch 103, i.e. the switch "on" time relative to the switch "off" time, to achieve the desired regulator output voltage at output terminal 111. When switch 103 is turned on, current flows through inductor 104 and across the load 107 such that the output voltage is equal to the input voltage. The current through inductor 104 causes energy to be stored in the inductor. When switch 103 is turned off, inductor 104 acts as a source, and current continues to flow across load 107. The rate at which the switch is operated is controlled by control device 106 in order to regulate the output voltage. The transfer function for this buck converter, i.e., how the output voltage is related to the input voltage is: $V_o = V_i \cdot DU$ where $V_o$ is the output voltage at terminal 111; $V_i$ is the input voltage at terminal 109; and DU is the duty cycle with $DU = T_{on}/T$ where T is the period of the switching frequency and Ton is the time within each cycle that the switch is on or closed. For example, a 50% duty cycle, where the switch is on half the time, will result in the output voltage being half the input voltage.

The feedback built into the system through control device 106 controls the duty cycle in response to load voltage requirements. When the output load increases, the output voltage drops. This drop is detected by control device 106, which causes the duty cycle to increase, increasing the output voltage.

Another known topology for voltage-sourced switched-mode power supplies is the boost or step up converter shown in FIG. 2, which provides an output voltage that is higher than the input voltage. In FIG. 2, the output voltage at terminal 211 of boost converter 200 is controlled by switch 203, which responds to feedback from the output voltage at terminal 211. The transfer function for the voltage-sourced boost converter is: $V_o = V_i/(1-DU)$.

In these known converters, if the input voltage source were replaced with a current source, i.e., a pure current source or a voltage source with a very high output impedance in series, the feedback loop would decrease the input power, since the input voltage is decreasing in response to an increase in the duty cycle—the opposite of what is required. Such a power supply can be referred to as a current-sourced power supply or a current-sourced converter.

High source impedance, therefore, makes the known voltage-sourced converters unstable. Assume, for example, zero source impedance. When the output load of a voltage-sourced converter increases, the only effect is the output voltage dropping slightly (due to increased losses), causing the feedback loop to increase the duty cycle. However, adding some input resistance causes the input voltage to drop further due to the voltage drop across this series resistance, requiring an additional increase in duty cycle. This causes the input current to increase, dropping the input voltage more, and increasing the duty cycle again. For some value of input resistance, this mechanism is unbounded, and leads to zero input voltage and maximum duty cycle.

Dr. R. D. Middlebrook recognized this condition and established the Middlebrook criterion for power supply design. The Middlebrook criterion requires that the source output impedance, which is often dominated by the impedance of the power supply's input filter, be much lower than the power supply input impedance, which is a function of the impedance of the power supply's output filter and loop response.

Certain applications, however, result in a high impedance input source. For example, in applications having long input cables, such as telecommunications systems e.g., power to telephones in the public telephone system; data collecting with instruments powered at the end of long cables, including, for example, borehole electronics placed at the end of a long cable fed into a borehole for sensing and measurement purposes); and systems deployed along long undersea cables, the cables provide a high impedance input to any power supplies at the remote end of the cable. For these applications, shunt or linear regulators are currently used instead of switched-mode power supplies. The shunt regulator, however, is less efficient than a switched-mode power supply because it has the undesirable property of drawing a constant power from the source, no matter what the load is. At typical or minimum loads, therefore, the shunt regulator efficiency is very poor.

Other applications that result in a high impedance input source might include, for example, medical applications where power is transmitted through the body to a device located in the body. In such applications the air and tissue through which the power must be transmitted have a high impedance so that the internal power supply will see an input source with a high impedance. This might also be the case in other applications where power is transmitted wirelessly, such as providing power to a passive smart card. In such an example the high impedance of the air through which the power is transmitted results in the power supply of the device seeing a high impedance input source.

What is needed is a switched-mode power supply that exhibits stable operations with a high impedance input source. As disclosed herein, known converters can be reconfigured to accommodate a high impedance source by arranging the components so as to reverse the phase of the feedback so that the duty cycle decreases instead of increases in response to a decrease in the output voltage.

OBJECTS OF THE INVENTION

One object of the present invention is to provide a switched-mode power supply that can provide stable operations from a high impedance voltage source or from a pure current source input.

Another object of the present invention is to provide various topologies of switched-mode power supplies that can provide stable operations from a high impedance or pure current source input and which correspond to common topologies for switched-mode power supplies operating from low impedance or pure voltage source inputs.

SUMMARY OF THE INVENTION

FIG. 3 shows a schematic diagram for a current-sourced boost converter. This circuit transforms an input current to a higher output current-analogous to the voltage-sourced boost converter. The configuration of this circuit is similar to the buck or step-down converter shown in FIG. 1 except that the duty cycle of the current-sourced boost converter is the inverse of the voltage-sourced equivalent boost converter.

Other known voltage-sourced converters, such as the boost, buck, buck-boost (flyback), boost-buck (Cuk), and even the charge pump converters, have an equivalent current-sourced circuit where an inverse duty cycle control is used. Similarly, any topology of voltage-sourced converter will have an equivalent current-sourced circuit where an inverse duty cycle control is used.

DETAILED DESCRIPTION OF THE INVENTION

Figure 4:
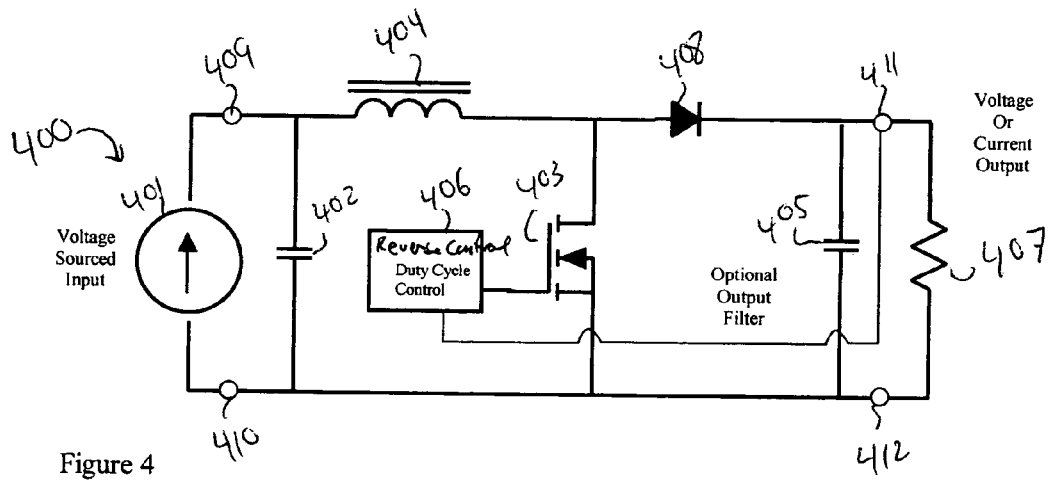
FIG. 4, is a schematic block diagram of a current-sourced Buck converter having a reverse-control law duty cycle controller.

FIG. 4 shows a power supply 400 having a current-sourced or high impedance input source 401 connected across input terminals 409 and 410, an input filter capacitor 402, an inductor 404, a switch 403, a control circuit 406, a diode 408, an output filter capacitor 405 and an output load 407 connected across output terminals 411 and 412. In operation, the input current is chopped and applied to the input filter 402. During start-up of power supply 400, while the input current and corresponding voltage are initially being increased, substantially no regulator operation occurs so long as the current delivered by the current source 401 is lower in magnitude than that required to result in the desired regulated output voltage at output terminal 411. Thus, at this point in the operation of supply 400, the duty cycle of shunt switch 403 (i.e. the portion of time the switch is closed within each switching cycle) is at a minimum of nearly 0%. As a result, substantially the same voltage appears at the regulator input and output terminals 409 and 411, respectively. As the current delivered by current source 401 increases, it exceeds the value required to generate the desired output voltage. As a result, the regulator output voltage at terminal 411 exceeds the desired output voltage and control circuit 406 responds by increasing the duty cycle of shunt switch 403. Thus, in response to an excessive regulator output voltage, the control circuit increases the shunt switch duty cycle in order to decrease the output voltage magnitude to that of the desired voltage, thereby following a reverse control law. With each closing of the shunt switch, energy is stored in inductor 404 in typical boost converter regulator fashion. Further, with each opening of the shunt switch, the energy stored in the inductor while the switch was closed is transferred to output filter capacitor 405 and load 407 connected across the regulator output terminals 411 and 412.

Power supply 400 is configured as a typical boost converter. In operation, supply 400 is assumed to be lossless. This is a reasonable assumption since switching type regulators primarily comprise reactive and switching components, which are highly efficient in operation.

Based on this assumption, during steady state operation, the power P.sub.in delivered to the regulator from source 401 is equal to the power P.sub.out delivered by the regulator to the load 407. This relationship is described in equation (1):

P.sub.in=P.sub.out (1)

Pin can be expressed as the product of the DC source voltage V.sub.in applied to the power supply 400 and the source current I.sub.in. Similarly, P.sub.out can be expressed as the product of the regulator DC output voltage V.sub.out and the current I.sub.out delivered by the regulator to the load 407. Thus, during steady state operation, regulator operation is described by equation (2): $V_{in} \cdot I_{in} = V_{out} \cdot I_{out}$ (2)

During the steady state operation of regulator 400, the current $I_{in}$ delivered to the regulator by the source is a DC current, filtered by capacitor 402, and is equal to the average current flowing in inductor 404. The current $I_{out}$ delivered by power supply 400 to the load 407 is equal to the average current flowing in diode 408 and has a magnitude that varies in inverse proportion to the switch duty cycle. Thus as the duty cycle is decreased or increased, respectively more or less current $I_{out}$ is delivered through diode 408 to the load, the balance of $I_{in}$ being shunted through switch 403. Correspondingly, respectively more or less power $P_{out}$ is delivered to the load. Filter capacitor 405 is effective to smooth the ripple in the current delivered to the load.

During steady state operation, power supply 400 maintains $V_{out}$ equal to the desired output voltage. Therefore, as the power requirement of the load increases or decreases, while $I_{in}$ remains constant, $I_{out}$ must be respectively increased or decreased. Power supply 400 accomplishes this by controlling the duty cycle and thus the magnitude of $I_{out}$ in the manner described above. Another operating situation is encountered where $I_{in}$ increases or decreases due to changes occurring in the source; the power $P_{out}$ required by the load remains constant. In this situation, to maintain $V_{out}$ equal to the desired output voltage, $I_{out}$ remains constant to maintain a constant $P_{out}$. Power supply 400 holds $I_{out}$ constant by increasing or decreasing the switch duty cycle where $I_{in}$ is respectively increased or decreased to a new value.

While the above-described relationship between $I_{out}$ and the switch duty cycle is typical of that found in a buck converter, the power supply 400 is configured as a boost converter. As a result, $V_{in}$ is less than or equal to $V_{out}$. Where the power requirement of the load increases or decreases while $I_{in}$ remains constant, equation (2) can be rearranged and written as equation (3): $V_{in} = I_{out} \cdot K_1$ (3)

where $K_1$ is a constant equal to $V_{out}/I_{in}$ since both $V_{out}$ and $I_{in}$ are constant. Then the regulator operation is effective to vary the duty cycle in the manner described above to adjust $I_{out}$ in order to meet the variation in the load power requirement. As seen in equation (3), $V_{in}$ varies in direct relationship with the variation in $I_{out}$ resulting from the variation in duty cycle. With $I_{in}$ constant, it is seen that the variation in $V_{in}$ results in a variation in $P_{in}$ so that $P_{in} = P_{out}$. $V_{in}$ is said to be compliant because it is allowed to vary as needed to provide the necessary input power.

In the operating situation discussed above, where $I_{in}$ increases or decreases while $P_{out}$ remains constant, equation (2) can be rewritten as equation (4): $V_{in} = K_2/I_{in}$ (4)

where $K_2$ is a constant equal to $V_{out} \cdot I_{out}$ since $V_{out}$ is regulated to be constant and $P_{out}$ (and hence $I_{out}$) is assumed constant in this situation. Power supply 400 varies the duty cycle in the manner previously described in response to the change in $I_{in}$. As a result of the duty cycle variation and as seen in equation (4), $V_{in}$ varies in inverse relation with $I_{in}$ in order to maintain $P_{in} = P_{out}$.

Thus in general the operation of power supply 400 is effective to vary the source voltage $V_{in}$ in order to control $P_{in}$. As the switch duty cycle increases or decreases, $V_{in}$ respectively decreases or increases. This situation is contrasted with that found in a typical boost converter operating from a low impedance voltage source. In the latter situation, regulator operation is effective to vary the source current $I_{in}$ to control $P_{in}$.

Figure 1:
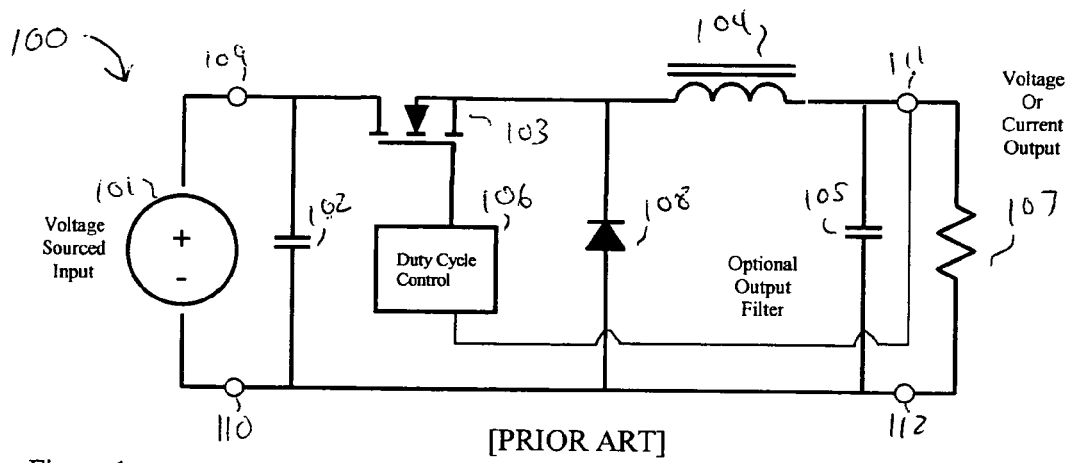
FIG. 1, is a schematic block diagram of a prior art voltage-sourced Buck converter.
Figure 2:
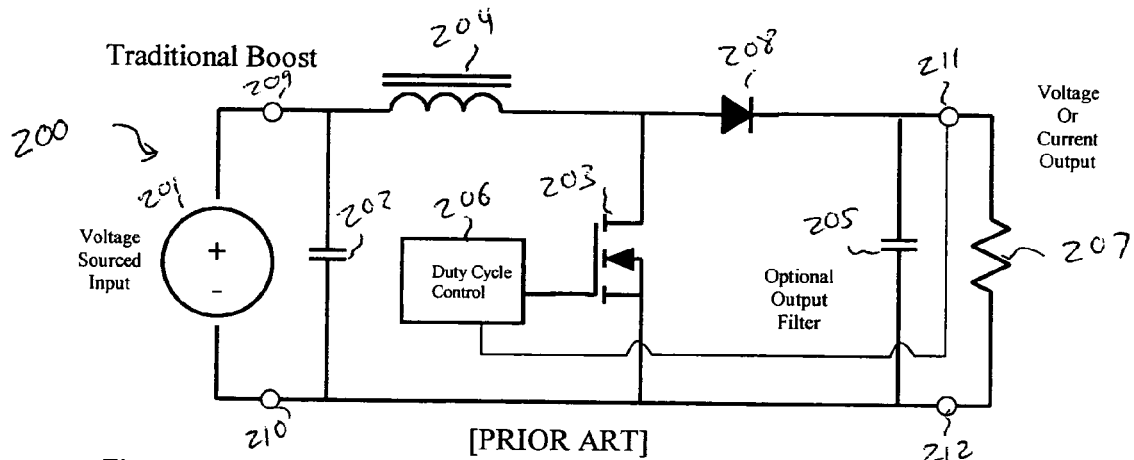
FIG. 2, is a schematic block diagram of a prior art voltage-sourced Boost converter.
Figure 3:
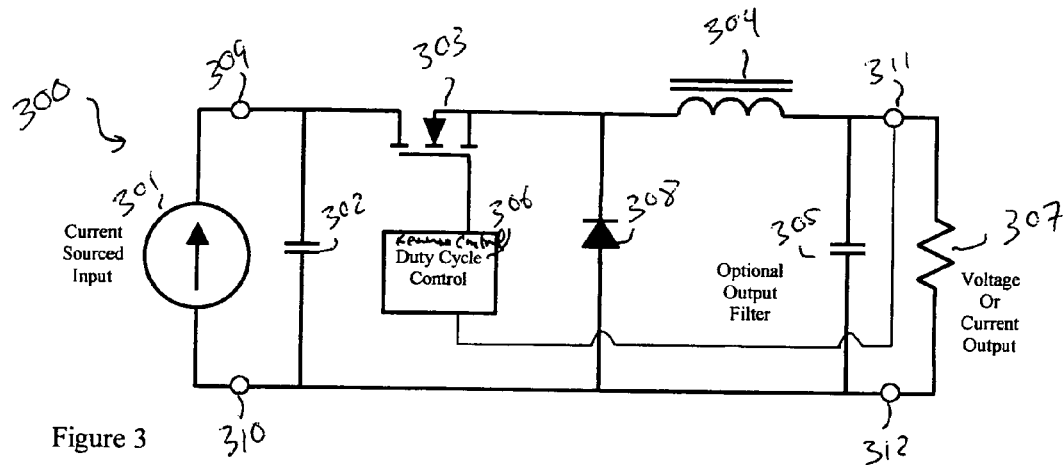
FIG. 3, is a schematic block diagram of a current-sourced Boost converter having a reverse-control law duty cycle controller.

As mentioned above, the circuit of FIG. 4 has the appearance of a voltage boost converter. However, the topology has a current transfer function equal to the average of the switch on time-or a buck-like function (it still has the familiar boost voltage function). Similarly, the circuit of FIG. 3, which has the appearance of a voltage buck converter, has a boost-like current transfer function.

Other power supply topologies, boost-buck (Cuk) and buck-boost (flyback) topologies, which provide a negative output from a positive input, can be similarly derived. The circuit of FIG. 5 resembles a voltage-sourced Cuk converter but is actually a current-sourced buck-boost converter. The circuit of FIG. 6 resembles the voltage-sourced buck-boost converter but is actually a current-sourced Cuk converter. FIG. 6 has continuous input voltage, and is generated from a current source boost-buck. In all cases, the converter's current output can be changed to a voltage simply by adding a load resistance $R_o$, with $V_o = I_o R_o$.

Figure 5:
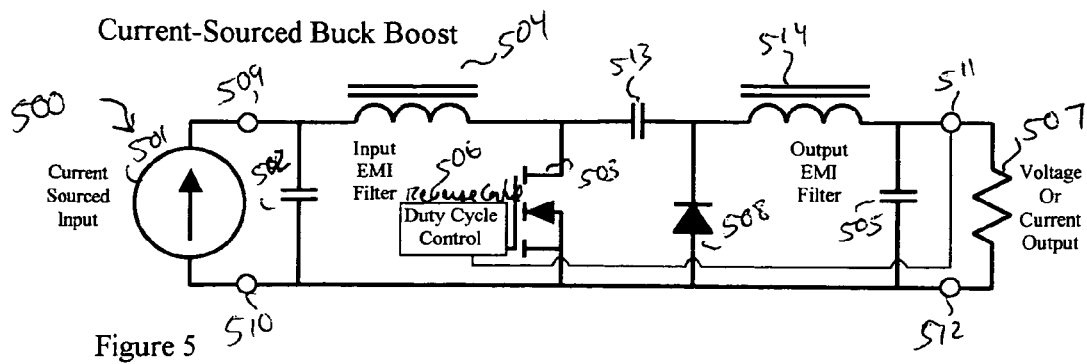
FIG. 5, is a schematic block diagram of a current-sourced Buck Boost converter having a reverse-control law duty cycle controller.
Figure 6:
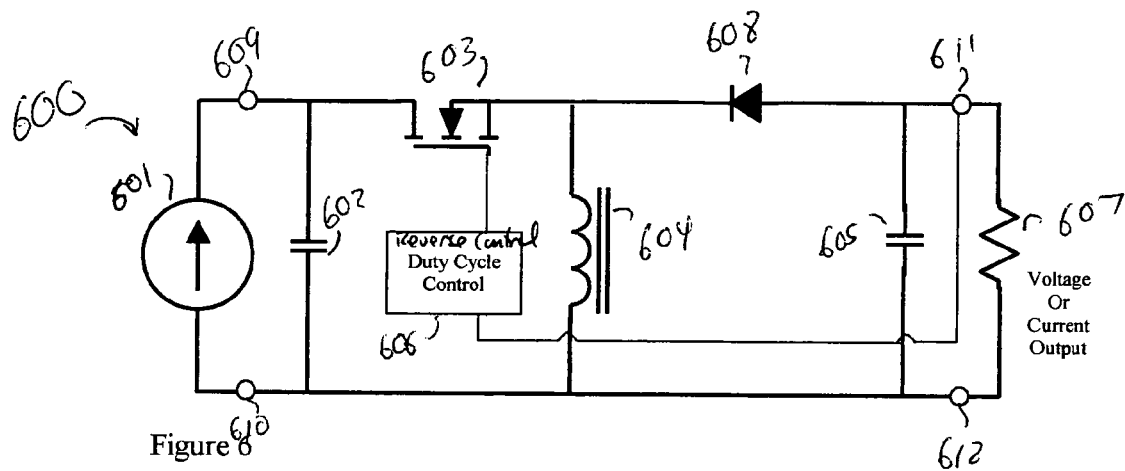
FIG. 6, is a schematic block diagram of a current-sourced Boost Buck converter having a reverse-control law duty cycle controller.

The schematics of FIGS. 5 and 6 are identical to common voltage-sourced power supply topologies. The input to output transfer function is not changed if the complement of the duty cycle is used. However, with a current-sourced supply, it is convenient to think in terms of a current transfer function instead of the voltage-sourced voltage transfer function. A switching regulator that boosts voltage must also buck current, and vice versa. Hence, a voltage-sourced boost is the same circuit as a current-sourced buck. For example, to create a current-sourced buck converter using an input current source, use a voltage-sourced boost topology and take the complement of the duty cycle control by switching the control of the diode and switch.

The table below shows the transfer functions for the various current source and voltage source converters: TABLE-US-00001 Current Voltage Source Transfer Function Source Transfer Function Buck $I_o=(1-DU)I_i$ Boost $V_o=V_i/(1-DU)$ Boost $I_o=I_i/DU$ Buck $V_o=V_i DU$ Cuk $I_o=I_i(1-DU)/DU$ Buck-Boost $V_o=V_i DU/(1-DU)$ Buck-Boost $I_o=I_i(1-DU)/DU$ Cuk $V_o=V_i DU/(1-DU)$ THE EFFECT OF SOURCE IMPEDANCE ON THE TRANSFER FUNCTION Increasing the source impedance of a conventional power supply affects the stability, eventually leading to oscillations. Decreasing the source impedance of a current-sourced supply as described herein can also cause it to oscillate. There is a crossover point in source impedance, above which a current-sourced topology must be used, and below which a voltage-sourced topology must be used.

For a current-sourced buck, such as that shown in FIG. 4, with input current source $I_{source}$ having a parallel source resistance $R_i$ on the input to ground, where $V_i$ and $I_j$ are the actual input voltage and current to the converter itself and $V_o$, $I_o$ and $R_o$ are the output voltage, current and resistance respectively:

$$V_o = I_o \cdot R_o$$

Using the transfer function for the current-sourced Buck $V_o = I_i(1-DU)R_o$ (5) $I_{source} - V_i R_i = I_i$ (6) $I_i = I_{source} + V_o(DU-1)R_i$ (7) $V_o = R_o(1-du)(I_{source} R_i + V_o(DU-1))R_i$ (8) $V_o = I_{source} R_o(1-DU)1 + R_o R_i(DU-1)^2$ (9)

Using the Thevinin equivalent: $V_o = V_{source} R_o(1-DU) R_i + R_o(1-DU)^2$ (10)

It can be seen how the gain varies with source impedance, going from: $V_o = V_{source} 1-DU$ .times. .times. voltage .times. .times. source .times. .times. zero .times. .times. impedance (11) Vo=IsourceRo(1−DU).times. .times. current .times. .times. source .times. .times. infinite .times. .times. impedance (12)

The same converter and control loop can't be stable for both transfer functions. To find the inflection point or peak value of the control function versus the input impedance solve: dd DU.times.(Vo=V.times. source R.times. o(1−DU)Ri+Ro(1−DU)2)(13) Ri=Vi Ii.times. .times. duty .times. .times. cycle .times. .times. inflection .times. .times. point (14)

The ratio of the input voltage to input current is the equivalent DC input impedance of the converter itself. The transition point occurs when the source impedance is equal to the DC input impedance of the power converter (which is also at the point of maximum power delivery from the source.) as a result a positive source impedance is driving the negative load impedance of the converter.

A voltage-sourced converter is affected more and more strongly as the input impedance moves from zero up to the value in equation (10). A current-sourced converter is similarly influenced as the input impedance moves down from infinity toward the same point. As the source impedance crosses the threshold, the phase of the control reverses and the original control loop becomes unstable. Similar analysis can be done for any switching topology.

Output Voltage Versus Duty Cycle in Detail

Equation (6) gives the output voltage of a voltage-sourced boost topology (or current-sourced buck, see FIG. 4) considering input impedance. To study the effect of the source impedance upon the duty cycle's transfer function, a set of parameters may be chosen that sets the control inflection point (equation 10) at a 50% duty cycle (DU). If the source impedance (Ri) was equal one ohm and the source voltage (V.sub.source) equal to one hundred volts, equation (10) shows that the control peak or inflection point occurs at a load resistance (Ro) of four ohms.

Figure 7:
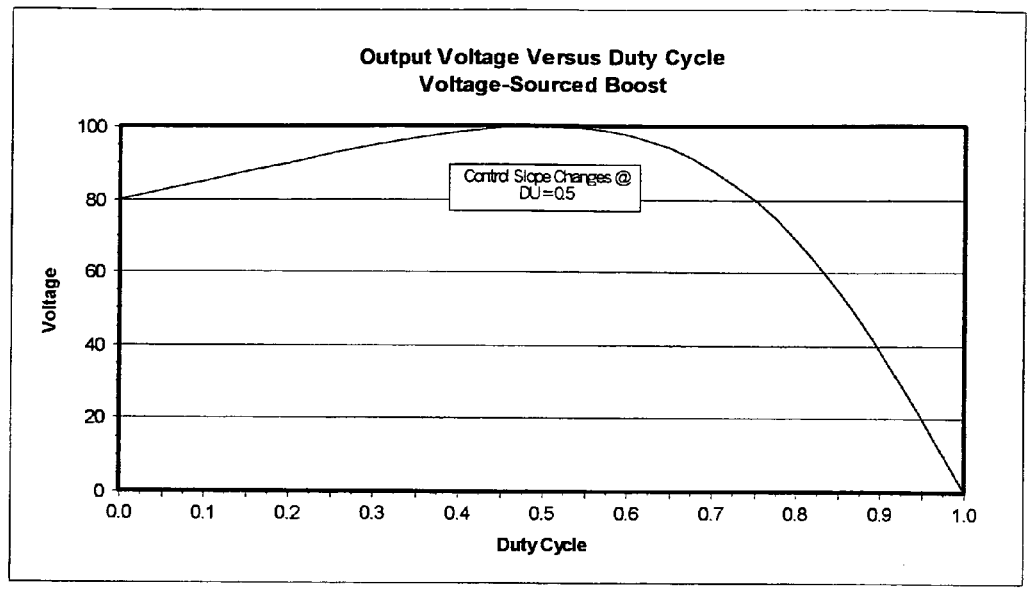
FIG. 7, is a plot of output voltage vs. duty cycle for a voltage-sourced boost converter.

FIG. 7 is the plot of equation (6) with the above values showing the nature of the DC loop gain. At low duty cycles, the circuit functions as a boost, trying to raise the input voltage. The source impedance limits the boosted voltage due to the input voltage drop, the maximum output voltage being 100 volts at a duty cycle of 0.5. Above this peak, the circuit functions as an inverted buck, with an increasing duty cycle decreasing output voltage.

Stability problems arise since there are two duty cycle values that give the correct output voltage, one on either side of the peak. The control loop cannot be stable around this peak unless bounded in one direction. It's easier to bound the duty cycle if normal operation is far away from this peak. Higher source impedances are not necessarily detrimental as such, but increasing the source impedance past a critical point will invert the feedback phase, insuring oscillation or latch up.

Many converters operate sufficiently far from the peak that phase reversal is unlikely. Other converters operate away from this peak, but transients (turn on, faults, load transients) may momentarily push the duty cycle over the peak, causing latch up.

Figure 8:
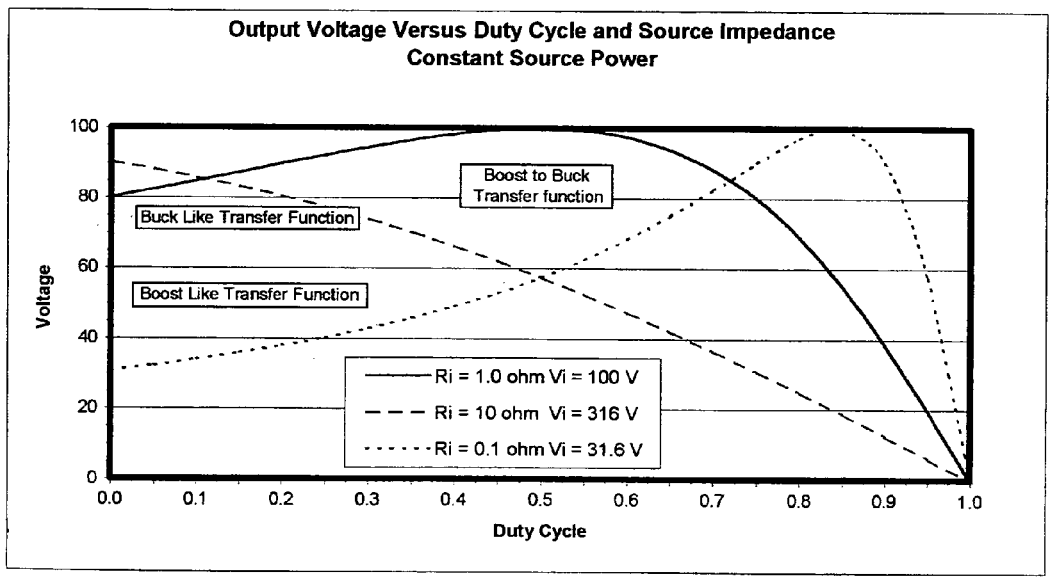
FIG. 8, is a plot of output voltage vs. duty cycle for various source impedance values.

The effect of varying the source impedance is examined in FIG. 8. In order to normalize the different curves the maximum source power delivery was kept the same: V.sub.source.sup.2/R.sub.source=constant.

At low impedances the curve's peak shifts to the right, with boost like properties dominating. At high impedances the curve shifts left, with buck-like properties dominating.

Design and Analysis

The stability of the voltage-sourced converter and its current-sourced equivalent are similar if the feedback loop has been inverted. Every voltage-sourced topology will function from a current-source if the complement of the duty cycle control is used. Hence, the term "Drive-Inversion" or "Inverted-Control" might be used as a synonym for "current-sourced," since inverting the duty cycle control is a needed to operate from a current-source and vice versa.

Voltage-sourced stability modeling techniques may be used, such as Middlebrook, Ridley, Valporian, etc., and modified as appropriate. For example, the current-sourced supply's stability is affected by decreasing input impedance where the voltage-sourced supply is affected by increasing input impedance. As in a voltage-sourced converter, an input EMI filter has a strong effect on input impedance, but in a current-sourced converter, the output impedance of the EMI filter should be kept as high as possible, contrary to the design objective of a voltage-sourced EMI filter.

The design of the feedback loop is not necessarily a straightforward adaptation of voltage-sourced theory. In a conventional current-mode switching regulator, the state variable (current) associated with the inductor is sensed and controlled as part of a high-speed inner loop. Controlling the inductor current removes the inductor from the frequency response of the converter, resulting in a single pole instead of a double pole system. In many current-sourced topologies, the current-source itself removes the inductor from the loop. Current sense is neither needed nor desired.

Using Standard PWM Controllers

Figure 10:
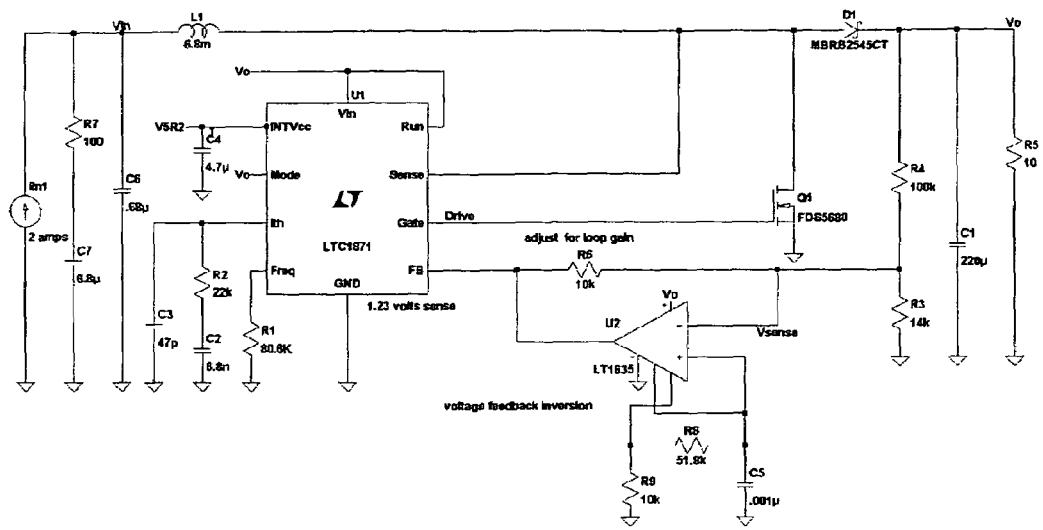
FIG. 10, is a schematic diagram of a current-sourced Buck converter configured to use the off-the-shelf LTC1871 control IC with an inverted Gate output.
Figure 9:
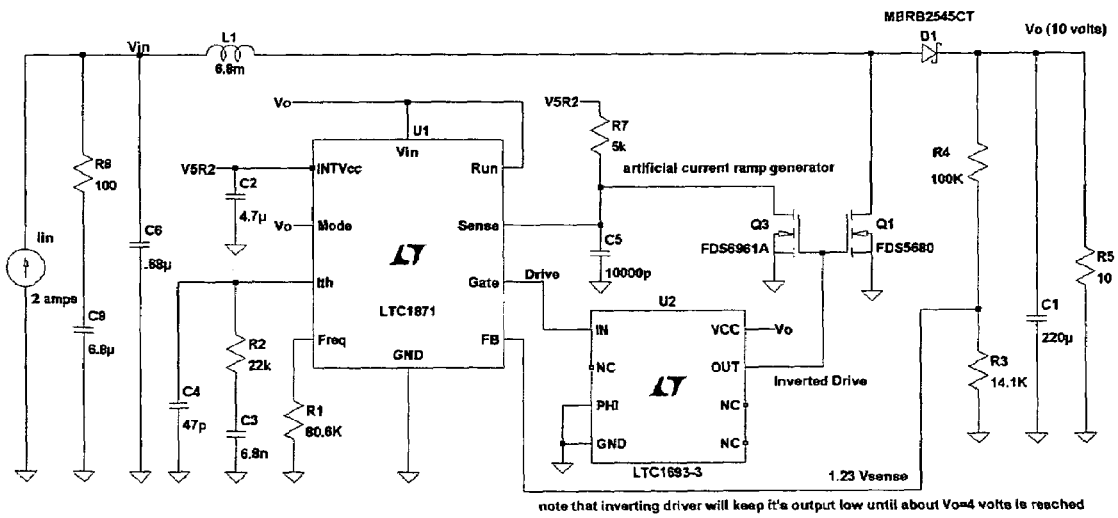
FIG. 9, is a schematic diagram of a current-sourced Buck converter configured to use the off-the-shelf LTC1871 control IC with an inverted FB input.

A standard off-the-shelf power supply cannot be modified to work with a current-sourced input since the phase of the internal feedback will be wrong. However, a standard Pulse Wave Modulator (PWM) control IC can be used to create a supply that works with a current source input. Some design changes allow almost any standard PWM control IC to work as a current-sourced regulator. FIGS. 9 and 10 illustrate two examples. Each figure presents a more detailed schematic of the current-sourced buck converter of FIG. 4 where Linear Technology LTC1871 PWM control IC (U1) is used in place of control IC 46.

The LTC1871 PWM Control IC (U1) has a Feedback (FB) input that, in a traditional voltage-sourced application, responds to a decreased output voltage by increasing the duty cycle of the shunt switch through the Gate pin. FIG. 9 shows an embodiment in which the common voltage-sourced circuit is modified to accommodate a current source input. In FIG. 9, the phase of the drive output from the Gate pin of control IC (U1) is inverted using an inverting drive IC (U2). In FIG. 9, IC (U2) is a Linear Technologies LTC1693-3 driver, which, configured as shown, causes the output from the OUT pin to have the opposite polarity of the input to the IN pin. As a result, Control IC (U1), sensing an increasing output voltage, generates a drive output from the Gate pin that would normally decrease the duty cycle of switch (Q1). But the inverted output from (U2) has the opposite effect, increasing the duty cycle of switch (Q1).

Using the LTC1693-3 driver to invert the drive signal also prevents a potential problem that might result if the drive signal were merely inverted directly. The default start up drive to the switch (Q1) should be off so the switch is open, since it is a switch to ground. If the drive is inverted, the normal start up mode will be with the switch on. This would short out the input current source, so there is no voltage to the Control IC (U1). The LTC1693-3 driver, however, inverts the drive, and keeps its output low until the output voltage reaches about 5 volts, at which point U1 and U2 function properly.

A second problem of the embodiment of FIG. 9 is that Control IC (U1) is expecting an increasing current sense ramp (at pin FB of U1) when its drive output is high. With the inverted drive, the current sense will be out of phase with ON time of the controller. Since current mode control is superfluous with a current-source input, the controller can be modified by adding a constant voltage ramp to the current sense input using components Q3, R7 and C5 of FIG. 9.

FIG. 10 shows a second preferred embodiment in which the common voltage-sourced circuit is modified to accommodate a current-sourced input. Whenever a floating drive is involved, the driver must be more sophisticated. A synchronous converter has two drive outputs needing inversion, one of which is floating. In these cases, it is easier to invert feedback using an external op amp. This circuit is shown in FIG. 10 where an op amp with a built in reference is used to invert the feedback circuit. The current-sense input to the Control IC (U1) may still be used, since the phase of drive is kept in phase with the current sense.

In the embodiment of FIG. 10, inverting op amp (U2) inverts the phase of the signal used to drive the feedback (FB) input. The control IC (U1) now sees a decreasing output voltage when the output voltage is actually increasing, causing the Gate output of Control IC (U1) to respond to the actual output voltage opposite to the way it would normally respond. To avoid upsetting the loop gain by introducing too much gain or additional phase shift, the input voltage range of Control IC (U1) should not be exceeded. Additionally, the current-sense shown in FIG. 10 may be replaced with the artificial ramp generation shown by Q3, R7 and C5 in FIG. 9.

In either FIG. 9 or FIG. 10, the input filter impedance should be as high as possible, implying large inductances and small capacitances, or the filter may be omitted and the converter operated from a pure current source. As the input voltage is increased, the filter size for a current-sourced topology will decrease from that for a voltage-sourced topology. Current-sourced topology should be useful for high voltage inputs where conventional voltage-sourced filters are at a size disadvantage. The following table identifies some of the practical differences between voltage and current-sourced switching regulators. TABLE-US-00002 Design Area Voltage Sourced Current Sourced Input Filter Low Z.sub.o, capacitor based High Z.sub.o, inductor based Input Protection Fuse, opens with current Transorb, shorts with voltage Feedback Normal Inverted Current-Mode Control Senses inductor current Senses capacitor voltage Current Ramp Helps stability Hurts stability The operational stresses of the current-sourced topologies are equivalent to stresses in the corresponding voltage-sourced topology. That is, a current-sourced boost topology has the same stresses as a voltage-sourced buck. For the example above, once the steady state duty cycle is known, all stresses may be found from the design equations published for conventional voltage-sourced boost regulators.

In addition to the DC described above, the concepts can be applied to AC impedances. The source impedance and input impedance are a function of frequency. If a plot of the source impedances and input impedance cross at any point where the feedback loop still has net gain, the loop will be unstable. Crossover of source and input impedance implies the phase of the feedback will be reversed at the transition point. This is an extension of the Middlebrook criterion, which states that the source impedance must be less than the input impedance. The converse is true for current-sourced invertors: the source impedance must be greater than the input impedance. Once the decision is made as to what side of the control peak the duty cycle should operate in, the control must stay on that side for any combination of input or output, at any frequency.

I claim:

1. A method for producing DC-to-DC conversion from a current source, said method comprising the steps of:
    inputting a compliant source voltage and a constant source current from the current source into a DC-to-DC converter that is one of a current-sourced buck, current-sourced buck-boost, and current-sourced boost-buck DC-to-DC converter that includes a switch for converting the input voltage to a desired output voltage; and
    increasing the duty cycle of said switch in the DC-to-DC converter when the output voltage of the DC-to-DC converter exceeds a desired output voltage and decreasing the duty cycle of said switch when the output voltage of the DC-to-DC converter is less than the desired output voltage.

2. The method for producing DC-to-DC conversion as claimed in claim 1 wherein said current source is a pure current source.

3. The method for producing DC-to-DC conversion as claimed in claim 1 wherein said current source is a voltage source having a source impedance that is greater than a DC input impedance of the DC-to-DC converter.

4. The method for producing DC-to-DC conversion as claimed in claim 1 further comprising controlling said switch with a control IC, said control IC having an input for receiving a feedback signal related to the output voltage of the DC-to-DC converter and a drive signal output for controlling the duty cycle of said switch.

5. The method for producing DC-to-DC conversion as claimed in claim 4 further comprising the steps of
    sensing the output voltage of the DC-to-DC converter;
    inverting the sensed output voltage of the DC-to-DC converter; and
    inputting the inverted sensed output voltage of the DC-to-DC converter into the control IC as the feedback signal for controlling the duty cycle of the switch based on the inverted sensed output voltage of the DC-to-DC converter.

6. The method for producing DC-to-DC conversion as claimed in claim 4 further comprising the steps of
    sensing the output voltage of the DC-to-DC converter;
    inputting the sensed output voltage of the DC-to-DC converter into the control IC as the feedback signal; and
    inverting the drive signal output of the control IC for controlling the duty cycle of the switch based on the inverted drive signal of the control IC.

7. An apparatus for performing a DC-to-DC conversion comprising:
    a current source;
    a DC-to-DC converter that is one of a current-sourced buck, current-sourced buck-boost, and current-sourced boost-buck DC-to-DC converter comprising a compliant source voltage input, a constant source current input, and a switch for converting the input voltage to a desired output voltage; and
    a control circuit for increasing the duty cycle of said switch in the DC-to-DC converter when the output voltage of the DC-to-DC converter exceeds a desired output voltage and decreasing the duty cycle of said switch when the output voltage of the DC-to-DC converter is less than the desired output voltage.

8. The apparatus as claimed in claim 7 wherein said current source is a pure current source.

9. The apparatus as claimed in claim 7 wherein said current source is a voltage source having a source impedance that is greater than a DC input impedance of the DC-to-DC converter.

10. The apparatus as claimed in claim 7 wherein said control circuit is a control IC, said control IC having an input for receiving a feedback signal related to the output voltage of the DC-to-DC converter and a drive signal output for controlling the duty cycle of said switch.

11. The apparatus as claimed in claim 10 further comprising:
a circuit for sensing the output voltage of the DC-to-DC converter; and
a circuit for inverting the sensed output voltage of the DC-to-DC converter for input into the control IC as the feedback signal for controlling the duty cycle of the switch based on the inverted sensed output voltage of the DC-to-DC converter.

12. The apparatus as claimed in claim 10 further comprising:
a circuit for sensing the output voltage of the DC-to-DC converter for input into the control IC as the feedback signal; and
a circuit for inverting the drive signal output of the control IC for controlling the duty cycle of the switch based on the inverted drive signal of the control IC.

13. An apparatus for performing a DC-to-DC conversion comprising:
means for providing a source current;
means for producing one of current-sourced buck, current-sourced buck-boost, and current-sourced boost-buck DC-to-DC conversion having a compliant source voltage input and a constant source current input and including a switch for converting the input voltage to a desired output voltage;
means for increasing the duty cycle of said switch in the DC-to-DC conversion means when the output voltage exceeds a desired output voltage and decreasing the duty cycle of said switch when the output voltage is less than the desired output voltage.

14. The apparatus as claimed in claim 13 wherein said means for providing a source current is a pure current source.

15. The apparatus as claimed in claim 13 wherein said means for providing a source current is a voltage source having a source impedance that is greater than a DC input impedance of the means for producing the one of buck, buck-boost, and boost-buck DC-to-DC conversion.

16. The apparatus as claimed in claim 13 wherein said means for increasing the duty cycle of said switch when the output voltage of the DC-to-DC conversion means exceeds a desired output voltage and decreasing the duty cycle of said switch when the output voltage of the DC-to-DC conversion means is less than the desired output voltage is a control IC, said control IC having an input for receiving a feedback signal related to the output voltage of the DC-to-DC conversion means and a drive signal output for controlling the duty cycle of said switch.

17. The apparatus as claimed in claim 16 further comprising:
means for sensing the output voltage of the DC-to-DC conversion means;
means for inverting the sensed output voltage for input into the control IC as the feedback signal for controlling the duty cycle of the switch based on the inverted sensed output voltage of the DC-to-DC conversion means.

18. The apparatus as claimed in claim 16 further comprising:
means for sensing the output voltage of the DC-to-DC conversion means for input into the control IC as the feedback signal; and
means for inverting the drive signal output of the control IC for controlling the duty cycle of the switch based on the inverted drive signal of the control IC.

19. A method for producing DC-to-DC conversion, said method comprising the steps of:
inputting a source voltage and a source current into a DC-to-DC converter that is one of a current-sourced buck, current-sourced buck-boost, and current-sourced boost-buck DC-to-DC converter via an input cable having a length such that the cable impedance is substantially greater than an input impedance of the dc-dc converter, said DC-to-DC converter including a switch for converting the input voltage to a desired output voltage; and
increasing the duty cycle of said switch in the DC-to-DC converter when the output voltage of the DC-to-DC converter exceeds a desired output voltage and decreasing the duty cycle of said switch when the output voltage of the DC-to-DC converter is less than the desired output voltage.

20. The method for producing DC-to-DC conversion as claimed in claim 19 wherein the length of said cable is greater than one kilometer.

21. The method for producing DC-to-DC conversion as claimed in claim 19 wherein the switch is a semiconductor switch.

22. An apparatus for performing a DC-to-DC conversion comprising:
a power source;
a DC-to-DC converter that is one of a current-sourced buck, current-sourced buck-boost, and current-sourced boost-buck DC-to-DC converter having a source voltage input and a source current input and including a switch for converting the input voltage to a desired output voltage;
a cable having a length such that the cable impedance is substantially greater than an input impedance of the DC-to-DC converter, for inputting power from the power source into the source voltage input and the source current input of the DC-to-DC converter;
a control circuit for increasing the duty cycle of said switch when the output voltage exceeds a desired output voltage and decreasing the duty cycle of said switch when the output voltage is less than the desired output voltage.

23. The apparatus for producing DC-to-DC conversion as claimed in claim 22 wherein the length of said cable is greater than one kilometer.

24. The apparatus for producing DC-to-DC conversion as claimed in claim 22 wherein the switch is a semiconductor switch.

* * * * *